(12) United States Patent
Kurihara

(10) Patent No.: US 9,682,497 B2
(45) Date of Patent: Jun. 20, 2017

(54) LIGHT IRRADIATION MOLDING APPARATUS AND LIGHT IRRADIATION MOLDING METHOD

(75) Inventor: Fumio Kurihara, Tokyo (JP)

(73) Assignee: JSR Corporation, Tokyo (JP)

( * ) Notice: Subject to any disclaimer, the term of this patent is extended or adjusted under 35 U.S.C. 154(b) by 1018 days.

(21) Appl. No.: 13/990,663

(22) PCT Filed: Nov. 11, 2011

(86) PCT No.: PCT/JP2011/076032
§ 371 (c)(1),
(2), (4) Date: Jul. 26, 2013

(87) PCT Pub. No.: WO2012/073674
PCT Pub. Date: Jun. 7, 2012

(65) Prior Publication Data
US 2014/0061978 A1 Mar. 6, 2014

(30) Foreign Application Priority Data
Nov. 30, 2010 (JP) .................................. 2010-266000

(51) Int. Cl.
*B29C 33/06* (2006.01)
*B29C 35/08* (2006.01)
(Continued)

(52) U.S. Cl.
CPC .......... *B29C 33/06* (2013.01); *B29C 35/0888* (2013.01); *B29C 43/006* (2013.01);
(Continued)

(58) Field of Classification Search
CPC .... B29C 2035/0822; B29C 2043/3652; B29C 33/06; B29C 35/0888; B29C 43/006; B29K 2821/00
See application file for complete search history.

(56) References Cited

U.S. PATENT DOCUMENTS

| 2009/0224433 A1 | 9/2009 | Kurihara et al. |
| 2011/0114902 A1 | 5/2011 | Kurihara et al. |

(Continued)

FOREIGN PATENT DOCUMENTS

| JP | 2007 216447 | 8/2007 |
| JP | 2009 241455 | 10/2009 |

(Continued)

OTHER PUBLICATIONS

U.S. Appl. No. 14/358,856, filed May 16, 2014, Kurihara.
(Continued)

*Primary Examiner* — Robert J Grun
(74) *Attorney, Agent, or Firm* — Oblon, McClelland, Maier & Neustadt, L.L.P.

(57) ABSTRACT

A light irradiation molding apparatus includes a pair of rubber molds through which light passes, and a light-irradiating means for emitting light from surfaces of the pair of rubber molds to a particulate thermoplastic resin placed in the cavity. The light irradiation molding apparatus relatively and sequentially moves the pair of rubber molds and the light-irradiating means so that an irradiation position of light emitted from the light-irradiating means moves from a melted portion to an unmelted portion of the thermoplastic resin, and the light irradiation molding apparatus sequentially melts portions of the thermoplastic resin.

14 Claims, 7 Drawing Sheets

(51) Int. Cl.
*B29C 43/00* (2006.01)
*B29C 43/36* (2006.01)
(52) U.S. Cl.
CPC ............... *B29C 2035/0822* (2013.01); *B29C 2043/3652* (2013.01); *B29K 2821/00* (2013.01)

(56) References Cited

U.S. PATENT DOCUMENTS

| | | |
|---|---|---|
| 2011/0163481 A1 | 7/2011 | Kurihara et al. |
| 2011/0304079 A1 | 12/2011 | Kurihara et al. |
| 2012/0220746 A1 | 8/2012 | Kurihara et al. |
| 2013/0062816 A1 | 3/2013 | Kurihara |

FOREIGN PATENT DOCUMENTS

| | | |
|---|---|---|
| WO | 2007 058184 | 5/2007 |
| WO | 2009 123046 | 10/2009 |
| WO | 2010 047268 | 4/2010 |
| WO | 2010 047269 | 4/2010 |

OTHER PUBLICATIONS

International Search Report issued Dec. 13, 2011 in PCT/JP11/076032 filed Nov. 11, 2011.
U.S. Appl. No. 14/669,036, filed Mar. 26, 2015, Kurihara.

US 9,682,497 B2

LIGHT IRRADIATION MOLDING APPARATUS AND LIGHT IRRADIATION MOLDING METHOD

TECHNICAL FIELD

The present invention relates to a light irradiation molding apparatus and a light irradiation molding method for filling a cavity formed in a pair of light-transmissive rubber molds with thermoplastic resin, and irradiating the resin with light to form a molded article.

BACKGROUND ART

As methods for obtaining a molded article having a predetermined shape using thermoplastic resin, generally, there are various molding methods such as injection molding, blow molding, extrusion molding and press molding.

Aside from these general molding methods, Patent Document 1 discloses a method in which when a cavity of a molding die is filled with molten thermoplastic resin, the thermoplastic resin is irradiated with electromagnetic wave including a wavelength region of 0.78 to 2 μm through the molding die. According to this method, the thermoplastic resin is more strongly heated as compared with a molding die made of rubber due to difference in physical property between rubber configuring the molding dies and thermoplastic resin.

Patent Document 2 discloses that thermoplastic resin particles filled into a rubber cavity is irradiated with electromagnetic wave including a wavelength region of 0.78 to 2 μm, the thermoplastic resin is heated and melted and then, if a space remains in the cavity, the cavity is additionally filled with molten thermoplastic resin.

PRIOR ART DOCUMENTS

Patent Documents

Patent Document 1: JP 2007-216447 A
Patent Document 2: JP 2009-241455 A

SUMMARY OF THE INVENTION

Problem to be Solved by the Invention

In Patent Document 1, however, since the cavity of the molding die is filled with previously molten thermoplastic resin, a device for previously melting particulate or solid thermoplastic resin such as pellet is required. In Patent Document 2 also, if molten thermoplastic resin is additionally filled, a similar device is required. In Patent Document 1 and Patent Document 2, when molten thermoplastic resin is filled, it is necessary to prepare surplus molten thermoplastic resin, and it is difficult to reduce a using amount of thermoplastic resin.

The present invention has been accomplished in view of the conventional problems, and the invention provides a light irradiation molding apparatus and a light irradiation molding method which can form a molded article with high size precision while lowering deterioration of the resin even when a large and complicated-shaped molded article or a thermoplastic resin having a high melting temperature is formed, which does not require a device for previously melting thermoplastic resin and filling the thermoplastic resin into a cavity, and which can form a molded article with a small using amount of thermoplastic resin.

Means for Solving the Problem

A first aspect of the present invention relates to a light irradiation molding apparatus including:
a pair of rubber molds made of light-transmissive rubber and forming a cavity between surfaces of the rubber molds which face each other, and
a light-irradiating means for emitting light to particulate or solid thermoplastic resin placed in the cavity from surfaces of the pair of rubber molds, wherein
the pair of rubber molds and the light-irradiating means configured to be relatively and sequentially moved to melt portions of the thermoplastic resin which are required to be melted sequentially.

A second aspect of the present invention relates to a light irradiation molding method characterized by using a pair of rubber molds made of light-transmissive rubber and forming a cavity between surfaces of the rubber molds which face each other, and
a light-irradiating means for emitting light to particulate or solid thermoplastic resin placed in the cavity from surfaces of the pair of rubber molds;
melting sequentially portions of the thermoplastic resin which are required to be melted by moving the pair of rubber molds and the light-irradiating means relatively and sequentially.

Effects of the Invention

When a molded article of thermoplastic resin is to be formed by the light irradiation molding apparatus, particulate or solid thermoplastic resin is placed in a cavity between a pair of rubber molds, light irradiation is started from surfaces of the pair of rubber molds to a predetermined irradiation-start portion of thermoplastic resin by a light-irradiating means. At this time, most of the light passes through the rubber molds and is absorbed by the thermoplastic resin, and the thermoplastic resin is heated and melted.

The pair of rubber molds and the light-irradiating means are relatively and sequentially moved such that an irradiation position of light irradiated from the light-irradiating means moves from a portion of the thermoplastic resin where it starts melting or from a melted portion of the thermoplastic resin to a portion of the thermoplastic resin where it does not melt. According to this, it is only necessary to heat these portions of the thermoplastic resin such that these portions are locally melted, and intensity of light irradiation of the light-irradiating means can locally be concentrated.

Hence, even when a large and complicated-shaped molded article is to be formed in the cavity, the thermoplastic resin is heated by the light-irradiating means only for necessary time to melt the portions of thermoplastic resin in accordance with shapes of the portions, the portions of the thermoplastic resin can stably be melted without deteriorating the resin, and a molded article can be formed. Even when thermoplastic resin having high melting temperature is formed, it is possible to easily secure a heating amount which is necessary for melting.

As described above, since the present invention employs the configuration to relatively and sequentially move the pair of rubber molds and the light-irradiating means, even when a large and complicated-shaped molded article is formed or thermoplastic resin having a high melting temperature is formed, it is possible to stably form the molded article with high size precision. It is possible to prevent a heating capacity of the light-irradiating means from increasing, and the light-irradiating means having a small heating capacity can be employed.

Since particulate or solid thermoplastic resin is placed in the cavity, a device for previously melting thermoplastic resin and infusing the thermoplastic resin into the cavity is not required, and a molded article can be formed with a small using amount of thermoplastic resin.

Hence, according to the light irradiation molding apparatus, even when a large and complicated-shaped molded article is formed or thermoplastic resin having a high melting temperature is formed, it is possible to form the molded article with high size precision while lowering deterioration of resin, the device for previously melting thermoplastic resin and infusing the thermoplastic resin into the cavity is not required, and a molded article can be formed with the small using amount of thermoplastic resin.

It is possible that one of the pair of rubber molds and the light-irradiating means is fixed and the other one of them is moved, and both of them are moved in different directions. When solid thermoplastic resin is used, the solid thermoplastic resin can be placed in a portion of the cavity, and particulate thermoplastic resin can be placed in a remaining portion of the cavity.

According to the light irradiation molding method, like the invention of the light irradiation molding apparatus, even when a large and complicated-shaped molded article is to be formed or thermoplastic resin having high melting temperature is formed, it is possible to form the molded article with high size precision while lowering deterioration of resin, the device for previously melting thermoplastic resin and infusing the thermoplastic resin into the cavity is not required, and a molded article can be formed with a small using amount of thermoplastic resin.

MODE FOR CARRYING OUT THE INVENTION

Figure 1:
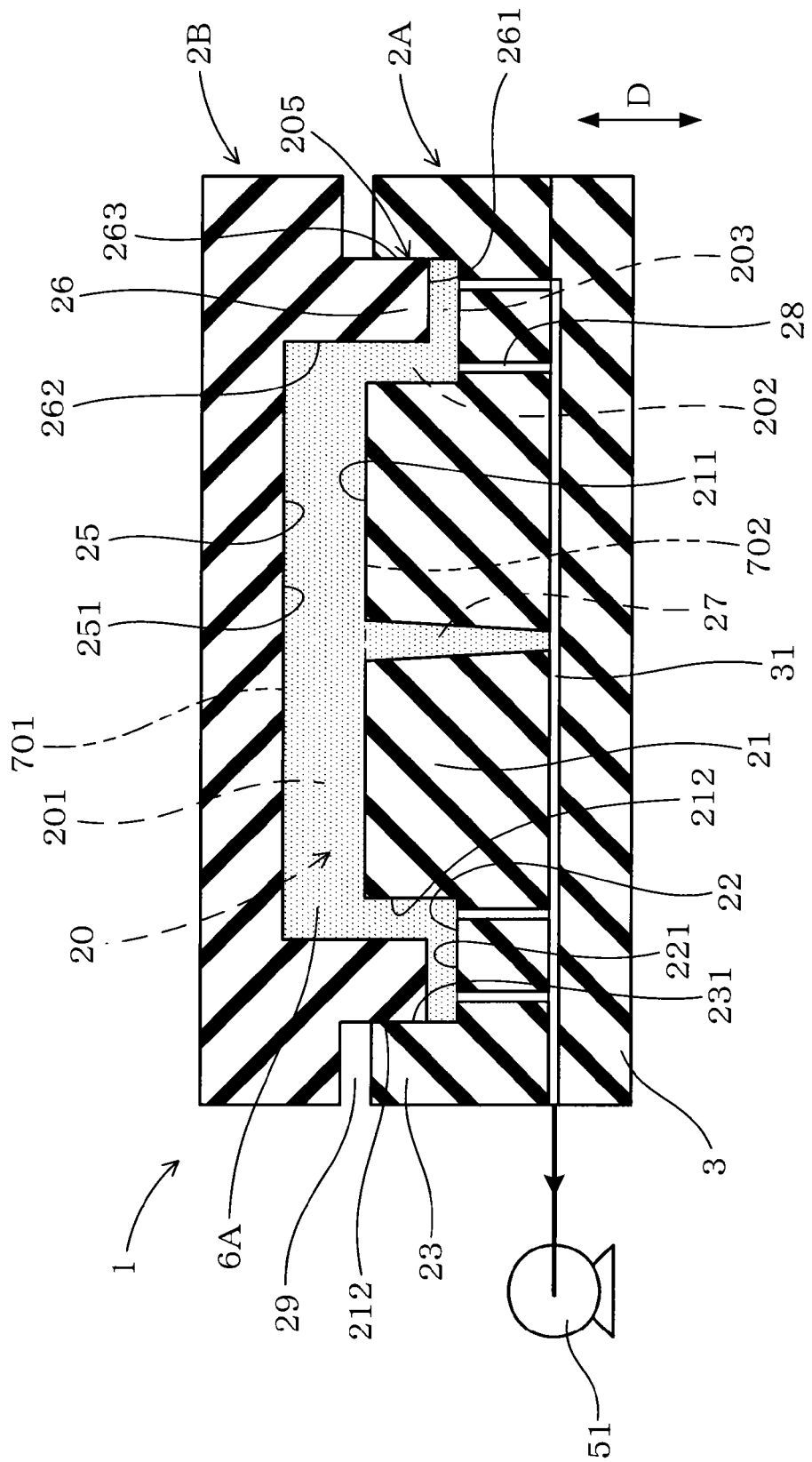
FIG. 1 is an explanatory sectional view, as viewed from front, of a state where thermoplastic resin is placed in a cavity between a pair of rubber molds located at original positions in EXAMPLE 1.

A preferred embodiment of the light irradiation molding apparatus and the light irradiation molding method will be described.

Particulate or solid thermoplastic resin is used. Here, particulate means spherical, cylindrical or indefinite shape which can be seen in a crushed product. Solid means a plate, a rod or a wire.

Particulate or solid thermoplastic resin can appropriately be selected depending upon a shape of a molded article to be formed. As particulate or solid thermoplastic resin, two or more kinds of thermoplastic resins can be mixed. Particulate thermoplastic resin and solid thermoplastic resin can be used in combination for each of portions of a molded article.

When the thermoplastic resin is particulate thermoplastic resin, a particle diameter of thermoplastic resin which can be used depends upon a thickness of a molded article to be formed, i.e., a width of a cavity. The particle diameter of thermoplastic resin can be in a range of 1 to 3,000 µm. The particle diameter of thermoplastic resin is preferably in a range of 50 to 3,000 µm, and more preferably in a range of 200 to 2,500 µm.

If an average particle diameter of thermoplastic resin is within these ranges and small particles of thermoplastic resin within a range of 1 to 100 µm are included, it is preferable in some cases when a cavity is filled with thermoplastic resin particles. Preferably, bulk specific gravity of particles is 0.4 or higher, more preferably 0.45 or higher and further more preferably 0.5 or higher.

It is preferable that the light-irradiating means generates light including a wavelength region of 0.78 to 2 µm. In this case, it is easy to make thermoplastic resin in a cavity absorb light as compared with the rubber molds, and it is possible to positively heat and melt thermoplastic resin as compared with the rubber molds.

As light (electromagnetic wave) which is emitted to the thermoplastic resin through the rubber molds, not only light of the region of 0.78 to 2 µm, but also light of other region may be included. In this case, as light which is emitted to the thermoplastic resin through the rubber molds, it is preferable that an amount of light of the region of 0.78 to 2 µm is greater than that of light of a region other than the former region.

As thermoplastic resin used for forming the molded article (simply called thermoplastic resin in some cases hereinafter), it is possible to use thermoplastic resin which absorbs light (electromagnetic wave) and which can be enhanced to be heated.

The thermoplastic resin is not especially limited only if it includes polymer having thermoplasticity. Examples of thermoplastic resin are: rubber reinforcement styrene-based resin such as ABS resin (acrylonitrile.butadiene.styrene resin), ASA resin (acrylate.styrene.acrylonitrile.resin), AES resin (acrylonitrile.ethylene-propylene-diene.styrene resin); styrene-based resin such as polystyrene, styrene.acrylonitrile copolymer, styrene.maleic anhydride copolymer, and (meth) acrylic acid ester.styrene copolymer; olefin-based resin such as polyethylene and polypropylene; cyclic olefin resin; acrylic-based resin; polycarbonate resin; polyester-based resin; polyamide-based resin; vinyl chloride-based resin; polyarylate resin; polyacetal resin; polyphenylene ether resin; polyphenylene sulfide resin; fluorine resin; imide-based resin; ketone-based resin; sulfone-based resin; urethane-based resin; polyvinyl acetate; polyethylene oxide; polyvinyl alcohol; polyvinyl ether; polyvinyl butyral; phenoxy resin; photosensitive resin; liquid crystal polymer; and biodegradable plastic. These can be used singularly or two or more kinds can be used in combination.

Of the above thermoplastic resins, preferable thermoplastic resins used for light irradiation molding are rubber reinforcement styrene-based resin, olefin-based resin, acrylic-based resin, polyester-based resin, polyamide-based resin, alloy of polyester-based resin and polycarbonate resin, alloy of rubber reinforcement styrene-based resin and polycarbonate resin, and alloy of rubber reinforcement styrene-based resin and polyester-based resin.

It is preferable that the above thermoplastic resins are amorphous thermoplastic resins.

Since the pair of rubber molds is made of rubber, a cooling speed of the thermoplastic resin becomes slow as compared with a metal mold. Hence, crystallinity of thermoplastic resin becomes high during a cooling operation in some cases and as a result, size precision of a molded article is deteriorated or impact resistance is lowered in some cases. If amorphous thermoplastic resin is employed as the thermoplastic resin, it is possible, in some cases, to prevent the size precision and the impact resistance of the molded article from being deteriorated.

Depending upon a purpose and use, the thermoplastic resin may include additive agent such as fiber, particulate or plate filler, decorating agent such as metallic pigment, ultraviolet absorbing agent, antioxidizing agent, anti-aging agent, antistatic agent, flame retardant, weather-resistant agent, plasticizing agent, lubricant, antibacterial agent, agent for providing hydrophilic property, and hypochromic coloring agent.

It is preferable that the pair of rubber molds is made of transparent or semi-transparent silicone rubber.

In this case, it is easy to make the rubber molds, and thermoplastic resin can selectively be heated by light including a wavelength region of 0.78 to 2 µm without heating the rubber molds almost at all.

It is preferable that hardness of silicone rubber is 25 to 80 in JIS-A standard measurement.

As will be described later, according to the light irradiation molding apparatus, a predetermined detecting means can detect a state of thermoplastic resin or rubber molds, and the controller can move the pair of rubber molds and the light-irradiating means relative to each other. A melting condition of thermoplastic resin is previously determined, and the controller can move the pair of rubber molds and the light-irradiating means relative to each other in accordance with this melting condition.

In the light irradiation molding method, the controller performs the relative movement and in addition, a state of thermoplastic resin or rubber molds is visually checked, and the relative movement between the pair of rubber molds and the light-irradiating means can be performed.

It is possible that the light irradiation molding apparatus includes a deformation amount-detecting means for detecting deformation amount of the pair of rubber molds caused by melting in portions of the thermoplastic resin, wherein the deformation amount-detecting means is configured to detect deformation of a portion of the pair of rubber molds irradiated with light by the light-irradiating means, and when deformation of the portion of the pair of rubber molds is detected, the pair of rubber molds and the light-irradiating means are configured to be relatively moved.

In this case, utilizing the property that the pair of rubber molds is deformed when thermoplastic resin is melted, the deformation amount-detecting means detects the deformation of the pair of rubber molds. According to this, it is possible to detect that portions of the thermoplastic resin are melted, and it is possible to appropriately move the pair of rubber molds and the light-irradiating means relative to each other in accordance with the melted state of the thermoplastic resin.

As the deformation amount-detecting means, it is possible to use a distance sensor using laser, ultrasound, and the like, a strain gage, a pressure sensor and the like.

It is also possible that the light irradiation molding apparatus includes a color change-detecting means for detecting color change of the thermoplastic resin when portions of the thermoplastic resin are melted, wherein the color change-detecting means is configured to detect color of portions of the thermoplastic resin irradiated with light by the light-irradiating means, and when color change of portions of the thermoplastic resin is detected, the pair of rubber molds and the light-irradiating means are configured to be relatively moved.

In this case, utilizing the property that its color is changed when thermoplastic resin is melted, the color change-detecting means detects that the thermoplastic resin is melted as the color change. According to this, it is possible to detect that portions of the thermoplastic resin are melted, and it is possible to appropriately move the pair of rubber molds and the light-irradiating means relative to each other in accordance with the melted state of the thermoplastic resin.

As the color change-detecting means, it is possible to use a spectrophotometer, a photoelectric colorimeter and the like. If thermopaint is used at a location to be detected, detection precision is enhanced in some cases.

It is also possible that the light irradiation molding apparatus includes a temperature detecting means for detecting a temperature of the thermoplastic resin when portions of the thermoplastic resin are melted, or a temperature of the rubber molds located in a vicinity of a melted portion of the thermoplastic resin, wherein the temperature detecting means is configured to detect a temperature of portions of the thermoplastic resin or portions of the rubber molds which is irradiated with light by the light-irradiating means, and when the temperature of portions of the thermoplastic resin or portions of the rubber molds rises to a predetermined temperature or higher, the pair of rubber molds and the light-irradiating means are configured to be relatively moved.

In this case, utilizing the fact that a temperature of the thermoplastic resin or a temperature of the rubber molds located in the vicinity of the thermoplastic resin rises when thermoplastic resin is melted, the temperature detecting means detects that the thermoplastic resin is melted as a temperature rise of the portion of the thermoplastic resin or the portion of the rubber molds. According to this, it is possible to detect that portions of the thermoplastic resin are melted, and it is possible to appropriately move the pair of rubber molds and the light-irradiating means relative to each other in accordance with the melted state of thermoplastic resin.

As the temperature detecting means, it is possible to use a pressure thermometer, a vapor pressure thermometer, a mercurial thermometer, a quartz thermometer, a bimetal, a thermocouple, a thermistor, an infrared thermography and the like.

It is preferable that the light irradiation molding apparatus includes a vacuum means for vacuuming an interior of the cavity, wherein the vacuum means is configured to reduce a pressure in the cavity so that the pressure in the cavity becomes lower than a pressure of outside of the pair of rubber molds to generate a suction force between the pair of rubber molds, and the pair of rubber molds is configured to approach each other while being deformed in order from a first melted portion to a later melted portion of the thermoplastic resin to form a molded article of the thermoplastic resin in the cavity whose capacity is reduced.

In this case, a cavity having a capacity greater than a molded article to be formed is formed between the pair of rubber molds, and when particulate or solid thermoplastic resin is melted, the capacity of the cavity is reduced and a molded article can be obtained. In this case, if the pair of rubber molds is made to approach each other utilizing a suction power (mold clamping force) generated by the vacuum means, it is possible to easily make molten thermoplastic resin spread over the entire cavity.

It is preferable that the light irradiation molding apparatus, wherein a frame-shaped or annular to-be fitted concave portion is formed in an entire periphery of the cavity of one of the pair of rubber molds, a frame-shaped or annular fitting convex portion is formed on the other one of the pair of rubber molds to be fitted into the to-be fitted concave portion, the entire periphery of the cavity is configured to be closed by fitting the fitting convex portion into the to-be fitted concave portion, and the fitting convex portion is configured to slide relative to the to-be fitted concave portion in order from a first melted portion to a later melted portion of the thermoplastic resin, and the pair of rubber molds is configured to approach each other while being deformed.

In this case, it is possible to easily prevent thermoplastic resin from leaking from a gap for making them approach each other formed in surfaces of the pair of rubber molds facing to each other.

EXAMPLES

EXAMPLES of the light irradiation molding apparatus and the light irradiation molding method will be described with reference to the drawings.

Example 1

Figure 2:
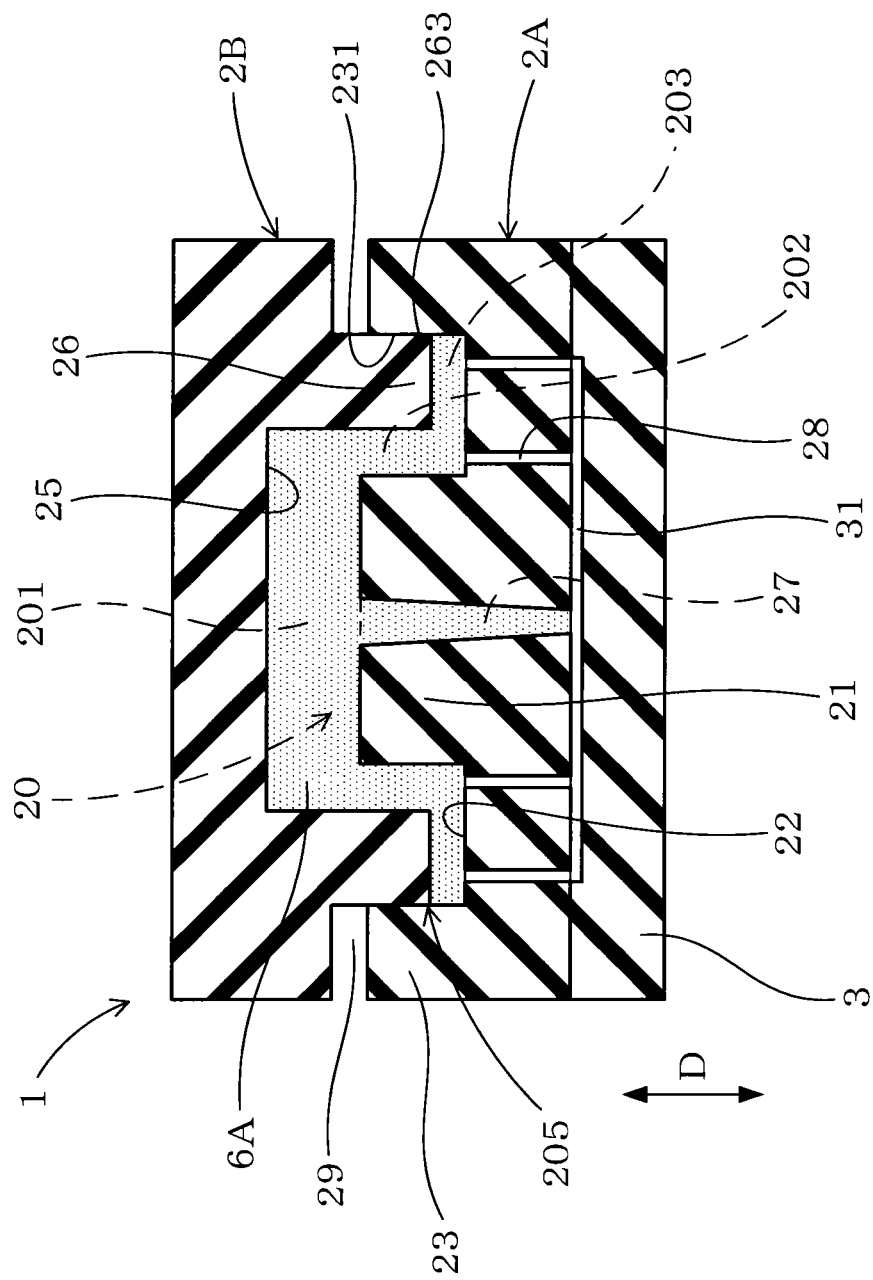
FIG. 2 is an explanatory sectional view, as viewed from side, of the state where the thermoplastic resin is placed in the cavity between the pair of rubber molds located at the original positions in EXAMPLE 1.
Figure 4:
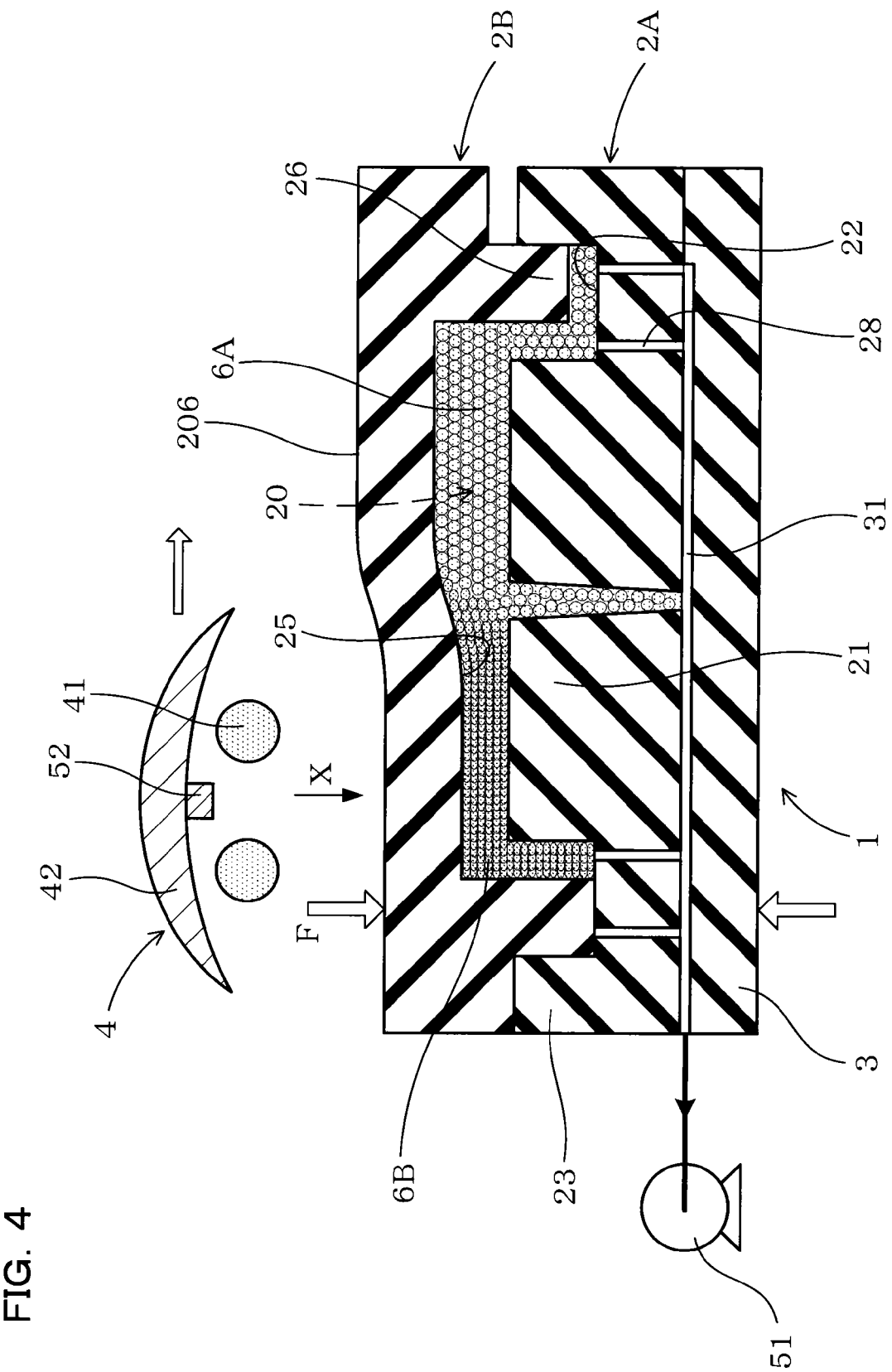
FIG. 4 is an explanatory sectional view, as viewed from front, of a state where thermoplastic resin irradiated with light is melted, and the pair of rubber molds partially and sequentially approaches each other in EXAMPLE 1.

As shown in FIGS. 1, 2 and 4, a light irradiation molding apparatus 1 of EXAMPLE 1 is made of light-transmissive rubber material through which light X passes. The light irradiation molding apparatus 1 includes a pair of rubber molds 2A and 2B forming a cavity 20 between their facing surfaces which match with each other, and a light-irradiating means 4 for emitting light X to a particulate thermoplastic resin 6A placed in the cavity 20 from surfaces of the pair of rubber molds 2A and 2B. The light irradiation molding apparatus 1 relatively and sequentially moves the pair of rubber molds 2A and 2B and the light-irradiating means 4 so that an irradiation position of light X emitted from the light-irradiating means 4 moves from a melted portion of the thermoplastic resin 6A to an unmelted portion of the thermoplastic resin 6A, and portions of the thermoplastic resin 6A are sequentially melted. In the drawings of EXAMPLE 1, 6A shows particulate thermoplastic resin, and 6B shows a melted thermoplastic resin.

The light irradiation molding apparatus 1 and a light irradiation molding method of EXAMPLE 1 will be described in detail with reference to FIGS. 1 to 7.

The pair of rubber molds 2A and 2B of EXAMPLE 1 is made of transparent or semi-transparent silicone rubber as rubber material. The pair of rubber molds 2A and 2B can be produced by placing, in a liquid silicone rubber, a master model (hand-made article) of a molded article 7 to be formed, hardening the silicone rubber, and taking out the master model from the hardened silicone rubber. Since the pair of rubber molds 2A and 2B is made of rubber, it is possible to easily and arbitrarily form a dividing surface (parting surface) 205 for opening molds when the molded article 7 after it is molded is taken out.

In EXAMPLE 1, particulate ABS resin which is amorphous thermoplastic resin and also rubber-modified thermoplastic resin is used as the thermoplastic resin 6A. As the thermoplastic resin 6A, it is possible to use resin having a volume average particle diameter of 1 to 3,000 µm, preferably 50 to 2,500 and more preferably 100 to 1,500 µm. In EXAMPLE 1, resin having the volume average particle diameter of 700 µm was used. The particulate thermoplastic resin 6A of EXAMPLE 1 is fine pellet of thermoplastic resin 6A having bulk specific gravity of about 0.5 to 0.6.

As shown in FIG. 4, the light-irradiating means 4 of EXAMPLE 1 is configured such that the light-irradiating means 4 generates light X including a wavelength region of 0.78 to 2 µm. The light-irradiating means 4 is configured using a halogen lamp which emits light X including wavelength region of 0.78 to 2 µm (substantially corresponding to wavelength region of near-infrared radiation). As the halogen lamp, a lamp having a peak of light intensity in wavelength region of 0.78 to 2 µm (about 0.9 µm in EXAMPLE 1) was used. The halogen lamp is configured using a light source 41 and a reflector 42 which collects light X emitted from the light source 41 and reflects the light.

According to the light irradiation molding apparatus 1 of EXAMPLE 1, the light-irradiating means 4 can selectively heat the thermoplastic resin 6A placed in the cavity 20 and form the molded article 7 with stable size precision as compared with the pair of rubber molds 2A and 2B made of silicone rubber.

Figure 7:
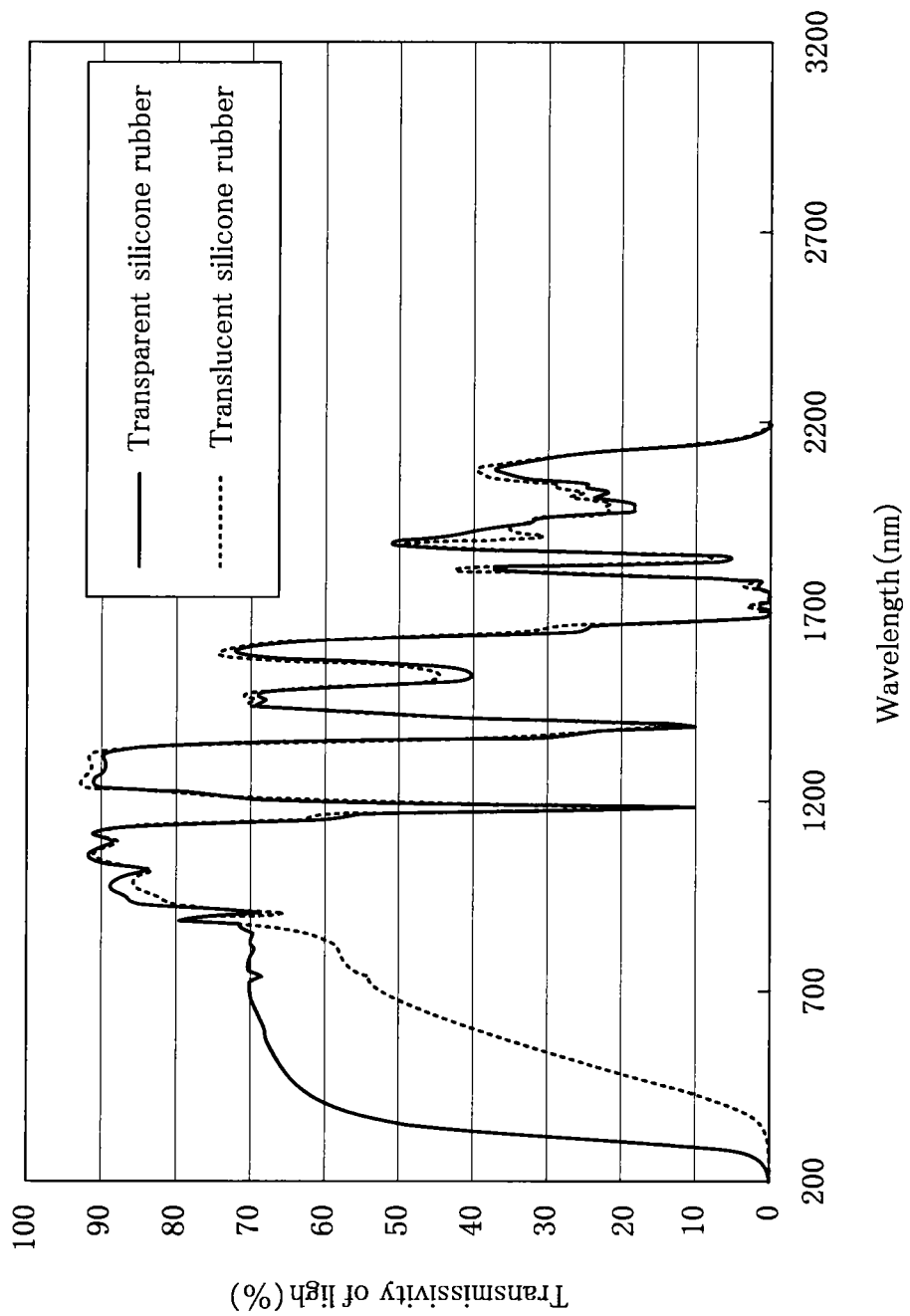
FIG. 7 is a graph showing transmissivity of light in a silicone rubber in EXAMPLE 1.

FIG. 7 is a graph showing transmissivity of light X of transparent silicone rubber and semi-transparent silicone rubber, wherein a lateral axis shows a wavelength (nm) and a vertical axis shows transmissivity (%) of light X in each of the silicone rubbers. In FIG. 7, it can be found that light X of wavelength of 200 to 2,200 (nm) passes through the silicone rubbers. Hence, if the surfaces of the rubber molds 2A and 2B made of silicone rubber are irradiated with near-infrared radiation in this wavelength region, most of near-infrared radiation can pass through the rubber molds 2A and 2B, and the thermoplastic resin 6A in the cavity 20 can be made to absorb the near-infrared radiation.

Figure 5:
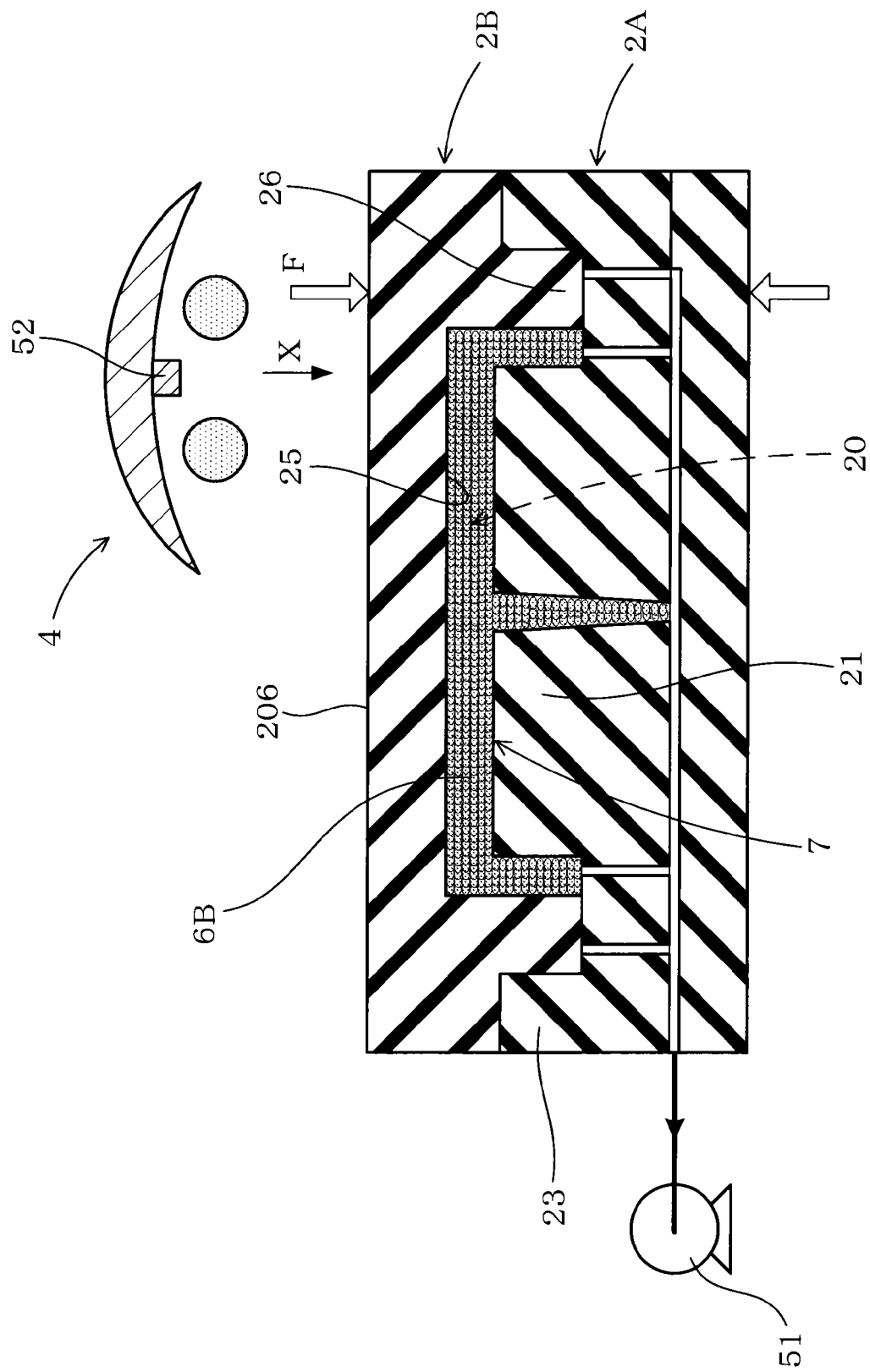
FIG. 5 is an explanatory sectional view, as viewed from front, of a state where thermoplastic resin irradiated with light is melted, and the pair of rubber molds is made to come closest slightly each other in EXAMPLE 1.

As shown in FIG. 1, the light irradiation molding apparatus 1 of EXAMPLE 1 includes a vacuum means 51 for vacuuming an interior of the cavity 20, in addition to the pair of rubber molds 2A and 2B and the light-irradiating means 4. The vacuum means 51 is a pump connected to the pair of rubber molds 2A and 2B, vacuums the interior of the cavity 20 in which the thermoplastic resin 6A is placed, and brings the interior of the cavity 20 into a vacuum state. As shown in FIGS. 4 and 5, the light irradiation molding apparatus 1 brings a pressure in the cavity 20 lower than a pressure of outside of the pair of rubber molds 2A and 2B, generates a suction power (mold clamping force) F between the pair of rubber molds 2A and 2B. According to this, the pair of rubber molds 2A and 2B approaches each other while being deformed in order from a first melted portion 6A, and the molded article 7 (see FIG. 6) of thermoplastic resin is formed in the cavity 20 whose capacity is reduced.

Figure 6:
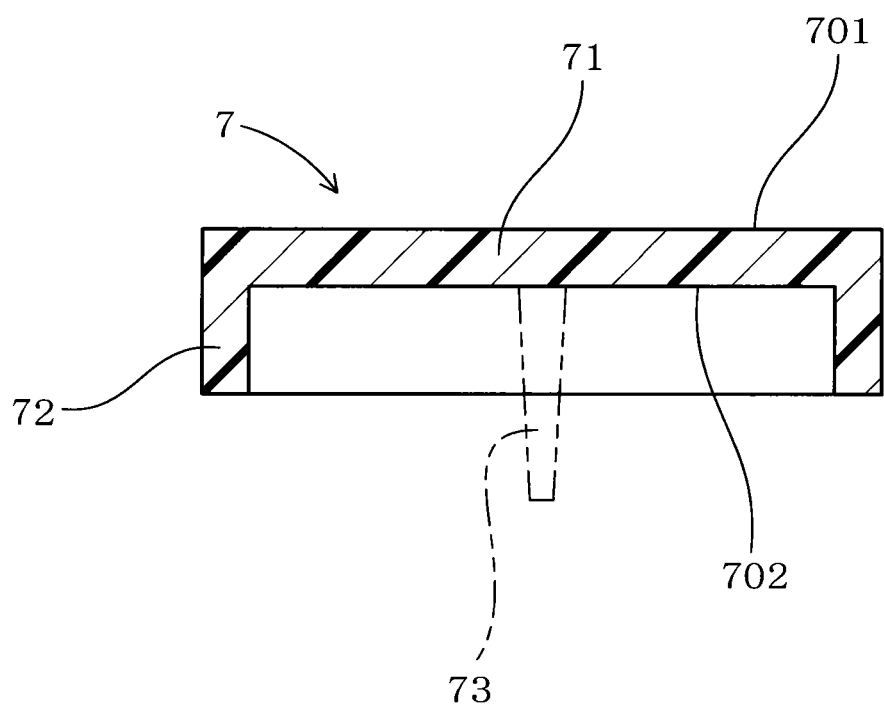
FIG. 6 is an explanatory sectional view of a molded article in EXAMPLE 1 as viewed from front.

As shown in FIG. 6, the molded article 7 formed by the light irradiation molding apparatus 1 of EXAMPLE 1 is configured by forming a rising wall 72 which rises substantially vertically or diagonally with respect to a body 71. The rising wall 72 of EXAMPLE 1 rises from the entire periphery of an outer edge of the body 71. Alternatively, the molded article 7 may have a configuration that the rising wall 72 substantially vertically or diagonally rises from an appropriate portion of the body 71. The molded article 7 may be formed by cutting a forming portion 73 formed in a later-described suction port 27.

As shown in FIGS. 1 and 2, the rubber mold 2A which is one of the pair of rubber molds 2A and 2B includes a cavity-forming convex portion 21 forming a back surface 702 of the molded article 7, and a projecting annular outer peripheral convex portion 23 forming an annular fitting concave portion 22 in an entire periphery of the cavity-forming convex portion 21. The rubber mold 2B which is other one of the pair of rubber molds 2A and 2B includes a cavity-forming concave portion 25 forming a design surface 701 of the molded article 7 by placing the cavity-forming convex portion 21 inside thereof, and an annular inner peripheral convex portion 26 projecting from the entire peripheral edge of the cavity-forming concave portion 25 and fitted into an inner peripheral surface 231 of the annular outer peripheral convex portion 23, which is placed in the annular fitting concave portion 22.

The to-be fitted concave portions of the rubber molds 2A and 2B of EXAMPLE 1 are formed by the annular fitting concave portion 22 and the annular outer peripheral convex portion 23 in the rubber mold 2A. The fitting convex portion in the rubber molds 2A and 2B of EXAMPLE 1 is formed by the annular inner peripheral convex portion 26 in the rubber mold 2B.

An outer peripheral surface 263 of the annular inner peripheral convex portion 26 in the rubber mold 2B is fitted into the inner peripheral surface 231 of the annular outer peripheral convex portion 23 at an original position before the pair of rubber molds 2A and 2B is made to approach each other. Before and after the pair of rubber molds 2A and 2B is made to approach each other, entire peripheries of the cavity 20 and the dividing surface 205 formed between the pair of rubber molds 2A and 2B are closed with the outer peripheral surface 263 of the annular inner peripheral convex portion 26 and the inner peripheral surface 231 of the annular outer peripheral convex portion 23.

Since the outer peripheral surface 263 of the annular inner peripheral convex portion 26 in the rubber mold 2B is fitted into the inner peripheral surface 231 of the annular outer peripheral convex portion 23 in the rubber mold 2A, it is possible to easily prevent molten thermoplastic resin 6B from leaking from a gap 29 formed in the dividing surface 205 for making the pair of rubber molds 2A and 2B approach each other.

As shown in FIG. 4, the light irradiation molding apparatus 1 of EXAMPLE 1 includes a deformation amount-detecting means 52 which detects an amount of deformation in the pair of rubber molds 2A and 2B caused by melting in portions of the thermoplastic resin 6A.

The pair of rubber molds 2A and 2B of EXAMPLE 1 is configured such that the annular inner peripheral convex portion 26 configured with the fitting convex portion relatively slides with respect to the annular fitting concave portion 22 and the annular outer peripheral convex portion 23 configured with the to-be fitted concave portions and the rubber molds 2A and 2B approach each other while being deformed in order from a first melted portion to a later melted portion of the thermoplastic resin 6A. The pair of rubber molds 2A and 2B of EXAMPLE 1 is configured such that a position of a backup plate 3 and a position of the rubber mold 2A which forms a vacuuming path 31 between the backup plate 3 and the rubber mold 2A are fixed, and when the thermoplastic resin 6A is melted, the rubber mold 2B approaches the rubber mold 2A.

Deformation generated in the pair of rubber molds 2A and 2B can be detected as a change in a distance from a predetermined position of the light-irradiating means 4 or a predetermined fixed position facing to the pair of rubber molds 2A and 2B to a surface of the rubber mold 2B of the pair of rubber molds 2A and 2B which is irradiated with light X. Deformation generated in the pair of rubber molds 2A and 2B can be understood as a reducing amount in thicknesses of the pair of rubber molds 2A and 2B in a facing direction D (see FIGS. 1 and 2).

As shown in FIG. 4, the deformation amount-detecting means 52 is provided on the light-irradiating means (halogen lamp) 4 which moves relative to the pair of rubber molds 2A and 2B. The deformation amount-detecting means 52 of EXAMPLE 1 is a distance sensor for irradiating a subject of measurement (surface 206 of rubber mold 2B) with light beam such as laser and ultrasound, and measuring a distance between the subject (surface 206 of rubber mold 2B) and the deformation amount-detecting means 52 in a non-contact manner.

Although it is not illustrated in the drawings, the pair of rubber molds 2A and 2B and the light-irradiating means 4 can be moved relatively to each other by a moving means, and the light irradiation molding apparatus 1 includes a controller for controlling the moving means. The controller is configured such that when a portion of the thermoplastic resin 6A which is irradiated with light X from the light-irradiating means 4 is melted and the deformation amount-detecting means 52 detects that portions of the pair of rubber molds 2A and 2B approach each other, the controller operates the moving means to change the portions which are irradiated with light X from the light-irradiating means 4.

As shown in FIG. 4, in the irradiation molding operation, when the thermoplastic resin 6A is melted and the rubber mold 2B approaches the rubber mold 2A, a distance between the deformation amount-detecting means 52 provided on the light-irradiating means 4 and the surface of the rubber mold 2B is increased. The deformation amount-detecting means 52 detects the increasing of the distance which is generated when portions of the thermoplastic resin 6A are irradiated with light X by the light-irradiating means 4 and the portions of the thermoplastic resin 6A are melted. When the increasing of the distance is detected, the controller relatively moves the pair of rubber molds 2A and 2B and the light-irradiating means 4.

Whenever the deformation amount-detecting means 52 detects deformation in the portions of the pair of rubber molds 2A and 2B, the controller relatively moves the pair of rubber molds 2A and 2B and the light-irradiating means 4 such that the unmelted other portions of the thermoplastic resin 6A are irradiated with light X emitted from the light-irradiating means 4.

As described above, the property that the pair of rubber molds 2A and 2B is deformed when the thermoplastic resin 6A is melted is utilized, the deformation amount-detecting means 52 detects deformation of the pair of rubber molds 2A and 2B. According to this, it is possible to detect that the portions of the thermoplastic resin 6A are melted. Hence, the pair of rubber molds 2A and 2B and the light-irradiating means 4 can relatively be moved appropriately in accordance with a melted state of the thermoplastic resin 6A.

The relative movement between the pair of rubber molds 2A and 2B and the light-irradiating means 4 can be carried out by various methods in accordance with a shape of a molded article 7 to be formed (shape of cavity 20).

For example, the pair of rubber molds 2A and 2B can be moved in a first lateral direction orthogonal to a facing direction D such that the pair of rubber molds 2A and 2B and the light-irradiating means 4 face each other, and the light-irradiating means 4 can be moved in a second lateral direction orthogonal to the facing direction D and the first lateral direction. The pair of rubber molds 2A and 2B and the light-irradiating means 4 can relatively be moved such that they turn around with respect to the thermoplastic resin 6A and the thermoplastic resin 6A is irradiated with light X. Alternatively, the pair of rubber molds 2A and 2B and the light-irradiating means 4 can relatively be moved in a meandering manner such that the thermoplastic resin 6A is irradiated with light X. Alternatively, the pair of rubber molds 2A and 2B and the light-irradiating means 4 can relatively be moved in a circular pattern such that the thermoplastic resin 6A is irradiated with light X.

It is also possible that only one of the pair of rubber molds 2A and 2B and the light-irradiating means 4 can move, and the thermoplastic resin 6A is straightly irradiated with light X.

As shown in FIGS. 1 and 2, at an original position between the pair of rubber molds 2A and 2B are made to approach each other, the cavity 20 of EXAMPLE 1 is continuously formed between a tip end surface 211 of the cavity-forming convex portion 21 and a bottom surface 251 of the cavity-forming concave portion 25, between an outer peripheral surface 212 of the cavity-forming convex portion 21 and an inner peripheral surface 262 of the annular inner peripheral convex portion 26, and between a bottom surface 221 of the annular fitting concave portion 22 and a tip end surface 261 of the annular inner peripheral convex portion 26.

As shown in FIGS. 4 and 5, the pair of rubber molds 2A and 2B is configured such that when the thermoplastic resin 6A placed in the cavity 20 is melted, the bottom surface 221 of the annular fitting concave portion 22 in the rubber mold 2A and the tip end surface 261 of the annular inner peripheral convex portion 26 in the rubber mold 2B approach each other until they abut against each other. When the pair of rubber molds 2A and 2B approaches each other and a molded article 7 is formed in the cavity 20, the thermoplastic resin 6B is supplied from a body space 201 formed between the cavity-forming convex portion 21 and the cavity-forming concave portion 25 and from a surplus space 203 formed between the bottom surface 221 of the annular fitting concave portion 22 and the tip end surface 261 of the annular inner peripheral convex portion 26 to a rising wall space 202 formed between the outer peripheral surface 212 of the cavity-forming convex portion 21 and the inner peripheral surface 262 of the annular inner peripheral convex portion 26. In FIGS. 4 and 5, the symbol 6A shows particulate thermoplastic resin, and the symbol 6B shows molten thermoplastic resin.

As shown in FIGS. 1 and 2, the suction port 27 which opens at the tip end surface 211 of the cavity-forming convex portion 21 and suction gates 28 which open at the bottom surface 221 of the annular fitting concave portion 22 are formed in the rubber mold 2A such that the suction port 27 and the suction gates 28 penetrates the rubber mold 2A. The suction port 27 of EXAMPLE 1 also functions as an input port through which the particulate thermoplastic resin 6A is thrown into the cavity 20. When particulate thermoplastic resin 6A placed in the body space 201 is melted, surplus molten thermoplastic resin 6B is made to overflow from the body space 201 to the suction port 27.

Figure 3:
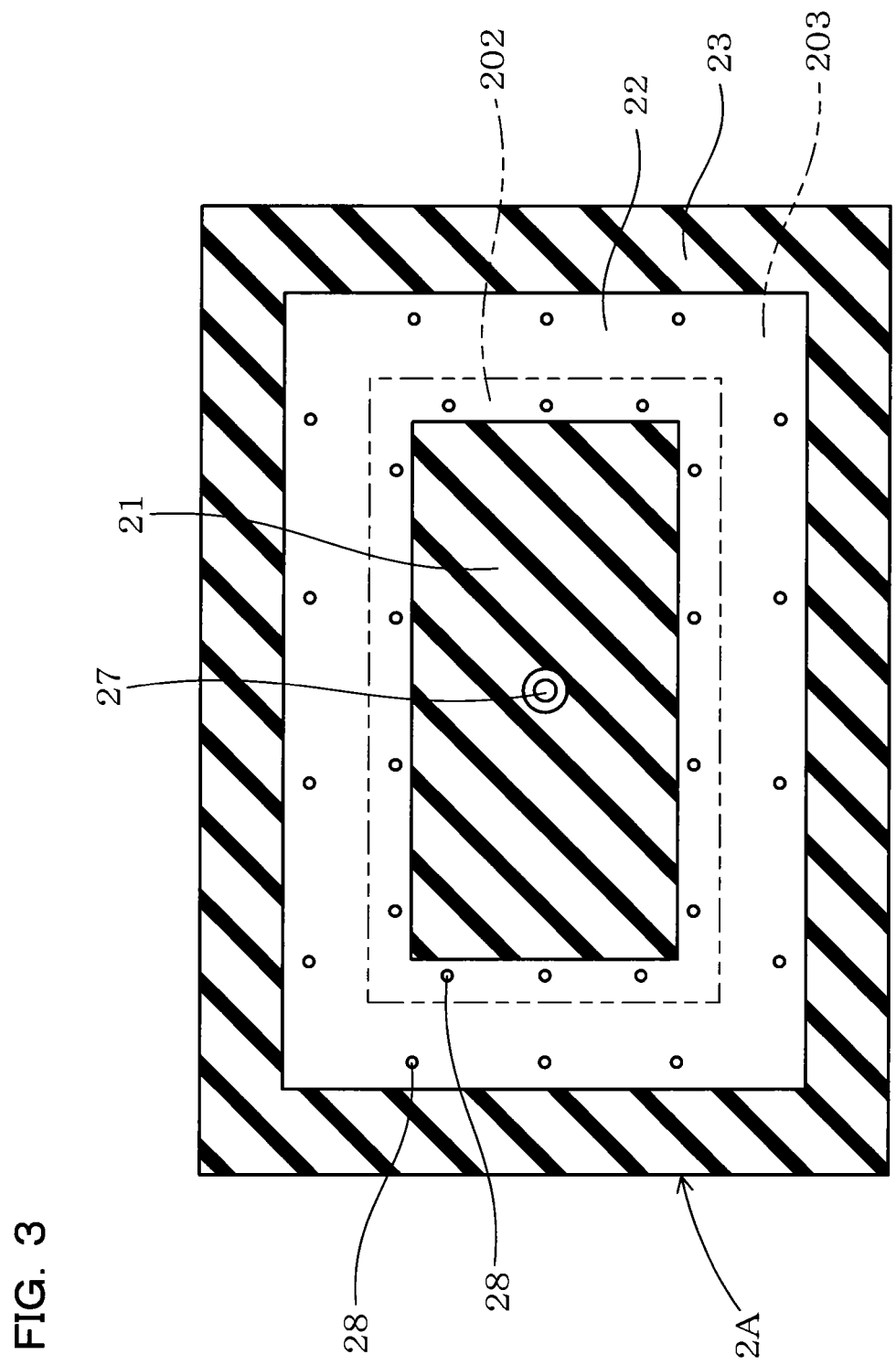
FIG. 3 is an explanatory sectional view, as viewed from above, of a forming state of a suction port of one of the rubber molds and a plurality of suction gates in EXAMPLE 1.

According to the molded article 7 formed in EXAMPLE 1, the rising wall 72 rises substantially vertically or diagonally from the entire periphery of the body 71 as described above. As shown in FIG. 3, in a quadrilateral of the annular shape of the bottom surface 221 of the annular fitting concave portion 22, the suction gates 28 are formed such that they open at a plurality of positions, i.e., at positions facing to the bottom surface 251 of the cavity-forming concave portion 25 and at positions facing to the annular inner peripheral convex portion 26. FIG. 3 shows a forming state of the suction port 27 and the plurality of suction gates 28 in the rubber mold 2A.

As shown in FIGS. 1 and 2, each of the suction gates 28 has a flow path cross-sectional area smaller than that of the suction port 27. The suction gate 28 has a small flow path cross-sectional area so that particulate thermoplastic resin 6A in the cavity 20 is not sucked when the vacuum means 51 sucks gas (air) in the cavity 20.

The backup plate 3 is superposed and placed on a side of the rubber mold 2A which is not facing to the rubber mold 2B. The vacuuming path 31 is formed between the rubber mold 2A and the backup plate 3 for vacuuming by the vacuum means 51. The vacuuming path 31 is in communication with the suction port 27 and the plurality of suction gates 28.

As shown in FIGS. 4 and 5, the light-irradiating means 4 of EXAMPLE 1 is placed so as to face to an outer surface 206 of the rubber mold 2B which is parallel to the bottom surface 251 of the cavity-forming concave portion 25. The light-irradiating means 4 is relatively moved along the outer surface 206 of the rubber mold 2B. In the light irradiation molding apparatus 1, particulate thermoplastic resin 6A placed in the cavity 20 is molten first from the side of the cavity-forming concave portion 25 by applying the light X emitted to the outer surface 206 of the rubber mold 2B. The suction gates 28 are prevented from being closed, and the vacuum means 51 continues the vacuuming operation until the molten thermoplastic resin 6B is charged into the entire cavity 20.

FIGS. 4 and 5 show a state where the pair of rubber molds 2A and 2B placed such that the rubber mold 2A provided with the suction port 27 comes lower side is irradiated with light X by the light-irradiating means 4 from above the rubber mold 2B. Alternatively, it is also possible that the pair of rubber molds 2A and 2B is placed in a state where the rubber molds 2A and 2B are combined with each other in the horizontal direction, and the light X is emitted from the horizontal direction. Alternatively, it is also possible that the rubber mold 2B is placed such that it comes lower than the rubber mold 2A, and the pair of rubber molds 2A and 2B is irradiated with light X by the light-irradiating means 4 from above the rubber mold 2A.

Next, the light irradiation molding method using the light irradiation molding apparatus 1 and a working effect obtained by EXAMPLE 1 will be described.

First, as shown in FIGS. 1 and 2, as a resin placing step, particulate thermoplastic resin 6A is placed in the cavity 20 formed between the pair of rubber molds 2A and 2B. At this time, the thermoplastic resin 6A can be thrown into the cavity 20 between the pair of combined rubber molds 2A and 2B from the suction port (input port) 27 formed in the rubber mold 2A. It is also possible that the thermoplastic resin 6A is placed in a cavity-forming concave portion 25 in the opened rubber mold 2B. In this case, the pair of rubber molds 2A and 2B in which the thermoplastic resin 6A is placed is combined with each other.

Especially, when solid thermoplastic resin is used, the pair of rubber molds 2A and 2B can be combined with each other after the thermoplastic resin is placed in the cavity-forming concave portion 25 or on the cavity-forming convex portion 21. As the thermoplastic resin, particulate thermoplastic resin and solid thermoplastic resin can be used in combination.

As shown in FIGS. 1 and 2, in a state where the pair of rubber molds 2A and 2B is combined with each other, the entire periphery of the dividing surface 205 formed between the pair of rubber molds 2A and 2B is closed with the inner peripheral surface 231 of the annular outer peripheral convex portion 23 in the rubber mold 2A and the outer peripheral surface 263 of the annular inner peripheral convex portion 26 in the rubber mold 2B.

Next, as a resin molding step, as shown in FIG. 1, the vacuum means 51 starts vacuuming gas in the cavity 20 from the vacuuming path 31 through the suction port 27 and the plurality of suction gates 28. At this time, air is sucked from the gap formed between the particulate thermoplastic resin 6A in the cavity 20, a suction force F trying to bring the pair of rubber molds 2A and 2B close to each other acts, and a pressure is applied between particles of the particulate thermoplastic resin 6A.

In EXAMPLE 1, as shown in FIG. 4, the light-irradiating means 4 is facing to an end position of the outer surface 206 in the rubber mold 2B. In a state where the vacuuming operation of the vacuum means 51 is continued, the light-irradiating means 4 emits light X including the wavelength region of 0.78 to 2 μm to the end position of the outer surface 206 in the rubber mold 2B. At this time, most of light X passes through the rubber mold 2B and is absorbed by the thermoplastic resin 6A at the end position of the cavity 20. Thermoplastic resin 6A located in the vicinity of the bottom surface 251 of the cavity-forming concave portion 25 in the rubber mold 2B placed on a side close to the light-irradiating means 4 is positively heated, and particulate thermoplastic resin 6A placed at the end position of the cavity 20 is melted in such order that particle of the thermoplastic resin 6A located in the vicinity of the bottom surface 251 of the cavity-forming concave portion 25 of the rubber mold 2B in the body space 201 of the cavity 20 is melted first.

At this time, the particulate thermoplastic resin 6A in the end position of the body space 201 is melted, a pressure which has been acted between particles of the particulate thermoplastic resin 6A is released, and a capacity of the end position of the body space 201 is reduced by the suction force F acting on the pair of rubber molds 2A and 2B. According to this, the pair of rubber molds 2A and 2B partially approaches each other by an amount corresponding to the reduced amount of the capacity of the end position of the body space 201.

Even after particulate thermoplastic resin 6A in the end position of the cavity 20 starts melting, the vacuum means 51 continuously vacuums the interior of the cavity 20.

As shown in FIG. 5, particulate thermoplastic resin 6A in the end position of the cavity 20 is melted in such order that particle of the thermoplastic resin 6A located in the vicinity of the bottom surface 251 of the cavity-forming concave portion 25 in the body space 201 of the cavity 20 is melted first and then, particle of the thermoplastic resin 6A located in the vicinity of the tip end surface 211 of the cavity-forming convex portion 21 is melted sequentially. Particulate thermoplastic resin 6A placed in the rising wall space 202 and the surplus space 203 in the end position of the cavity 20 are not melted and its particulate state is maintained until substantially entire particulate thermoplastic resin 6A placed in the body space 201 is melted. According to this, the vacuuming operation in the body space 201 in the cavity 20 is continued from the gap formed between particulate thermoplastic resin 6A placed in the suction port 27 and the plurality of suction gates 28.

Thermoplastic resin 6A in the cavity 20 is sequentially melted from its side irradiated with light X. According to this, the vacuuming operation in the cavity 20 can appropriately be continued, and air voids are not generated in a molded article 7 to be formed.

When particulate thermoplastic resin 6A in the end position of the body space 201 is melted and the pair of rubber molds 2A and 2B partially approaches each other, particulate thermoplastic resin 6A placed in the rising wall space 202 connected to the end position of the body space 201 and the surplus space 203 is melted.

When particulate thermoplastic resin 6A in the end position of the cavity 20 is melted and end positions of the pair of rubber molds 2A and 2B partially approach each other, the deformation amount-detecting means 52 detects deformation of the pair of rubber molds 2A and 2B. The controller of the light irradiation molding apparatus 1 controls the moving means, and a position where the pair of rubber molds 2A and 2B and the light-irradiating means 4 are facing to each other is changed to another portion of the cavity 20 filled with unmelted particulate thermoplastic resin 6A.

While the deformation amount-detecting means 52 detects deformation and the light-irradiating means 4 is facing to portions of the cavity 20 sequentially, unmelted particulate thermoplastic resin 6A in the entire cavity 20 can be melted. When the entire thermoplastic resin 6A placed in the cavity 20 is melted, the pair of rubber molds 2A and 2B approaches each other until the bottom surface 221 of the annular fitting concave portion 22 in the rubber mold 2A and the tip end surface 261 of the annular inner peripheral convex portion 26 in the rubber mold 2B abut against each other.

As described above, in the resin molding step, the vacuuming operation of the vacuum means 51 is continued until the entire cavity 20 is filled with the molten thermoplastic resin 6B, and the molten thermoplastic resin 6B can be made to spread over the entire cavity 20 whose capacity is reduced.

Then, as a resin cooling step, a state where the cavity 20 in the pair of rubber molds 2A and 2B is filled with molten thermoplastic resin 6B is maintained. At this time, the molten thermoplastic resin 6B is cooled and solidified, the body 71 is formed in the body space 201 and the rising wall 72 is formed in the rising wall space 202, and a thermoplastic resin molded article 7 can be formed.

Thereafter, as a molded article taking-out step, the pair of rubber molds 2A and 2B is released and the molded article 7 can be taken out.

In EXAMPLE 1, the thermoplastic resin 6A can selectively be heated and melted as compared with the rubber molds 2A and 2B, and it is possible to suppress the temperature rise of the rubber molds 2A and 2B to effectively heat thermoplastic resin 6A. Hence, when thermoplastic resin molded article 7 is formed, it is possible to effectively prevent thermal deterioration of the rubber molds 2A and 2B.

Since the capacity of the cavity 20 is reduced and a molded article 7 is formed, it is unnecessary to separately fill the cavity 20 with molten thermoplastic resin. A device such as a resin-infusing nozzle for previously melting thermoplastic resin 6A and infusing the thermoplastic resin 6A into the cavity 20 is not required. Substantially entire thermoplastic resin 6A placed in the cavity 20 can be used for forming a molded article 7.

When a thermoplastic resin molded article 7 is formed by the light irradiation molding apparatus 1 of EXAMPLE 1, the pair of rubber molds 2A and 2B and the light-irradiating means 4 are relatively and sequentially moved so that an irradiation position of light X emitted from the light-irradiating means 4 is moved from a melted portion of thermoplastic resin 6A to an unmelted portion of thermoplastic resin 6A. According to this, for portions of the thermoplastic resin 6A, it is only necessary to carryout the heating operation which is required for locally melting these portions, and it is possible to locally concentrate the light X-irradiation intensity of the light-irradiating means 4.

Hence, even when a large and complicated-shaped molded article 7 is formed in the cavity 20, the thermoplastic resin 6A is heated by the light-irradiating means 4 only for necessary time to melt the portions of the thermoplastic resin 6A in accordance with shapes of the portions, the portions of the thermoplastic resin 6A can stably be melted, and a molded article 7 can be formed. Even when thermoplastic resin 6A having a high melting temperature is formed, it is possible to easily secure a heating amount which is necessary for melting.

Conditions under which thermoplastic resin 6A is melted differ depending upon differences in irradiation intensity of light X of the light-irradiating means 4, shape of the cavity 20 which forms a molded article 7, a melting temperature of composition of thermoplastic resin 6A, a particle diameter of particulate thermoplastic resin (micro pellet) 6A, and a filling ratio (bulk specific gravity). The light irradiation molding apparatus 1 of EXAMPLE 1 employs a configuration that thermoplastic resin 6A is locally irradiated with light X by the light-irradiating means 4, and the irradiating position of light X is sequentially changed. For example, a molded article 7 can be formed using superheat resistant resin (PEEK, polyether ether ketone) having a high melting temperature as particulate thermoplastic resin 6A.

When thermoplastic resin 6A is heated by the light-irradiating means 4, the pair of rubber molds 2A and 2B is not heated more than their heatproof temperature.

EXAMPLE 1 employs the configuration that the pair of rubber molds 2A and 2B and the light-irradiating means 4 are relatively and sequentially moved. Therefore, even when a large and complicated-shaped molded article 7 or thermoplastic resin 6A having a high melting temperature is formed, the molded article can be formed with high size precision while lowering deterioration of the resin. It is possible to prevent the heating capacity of the light-irradiating means 4 from increasing, and light-irradiating means 4 having a small heating capacity can be employed.

Since the particulate thermoplastic resin 6A is placed in the cavity 20 of EXAMPLE 1, a device for previously melting thermoplastic resin 6A and infusing the thermoplastic resin 6A into the cavity 20 is not required, and a molded article 7 can be formed with a small using amount of thermoplastic resin 6A. In EXAMPLE 1, substantially entire thermoplastic resin 6A placed in the cavity 20 can be used for forming a molded article 7.

Therefore, according to the light irradiation molding apparatus 1 and the light irradiation molding method of EXAMPLE 1, even when a large and complicated-shaped molded article 7 or thermoplastic resin 6A having a high melting temperature is formed, the molded article 7 can be formed with high size precision while lowering deterioration of the resin, a device for previously melting thermoplastic resin 6A and infusing the thermoplastic resin 6A into the cavity 20 is not required, and a molded article 7 can be formed with a small using amount of thermoplastic resin 6A.

Example 2

In EXAMPLE 2, to detect that thermoplastic resin 6A is partially melted, a means other than the deformation amount-detecting means 52 is used.

A light irradiation molding apparatus 1 can be provided with, instead of the deformation amount-detecting means 52, a color change-detecting means for detecting color change of thermoplastic resin 6A when portions of the thermoplastic resin 6A are melted. According to the light irradiation molding apparatus 1, the color change-detecting means detects color of a portion of thermoplastic resin 6A which is irradiated with light X by the light-irradiating means 4, and when the color change of the portion of the thermoplastic resin 6A is detected, a pair of rubber molds 2A and 2B and the light-irradiating means 4 are relatively moved.

A colorimeter, a spectrophotometer and the like can be used as the color change-detecting means. When thermoplastic resin 6A is melted, a color which can be seen from a surface of a rubber mold 2 is changed (if thermoplastic resin 6A is melted, surface of rubber mold 2 looks black). Utilizing this property, the color change-detecting means detects, as color change, that thermoplastic resin 6A is melted. According to this, it is possible to detect that portions of the thermoplastic resin 6A are melted. A controller of the light irradiation molding apparatus 1 can move the light-irradiating means 4 relative to the pair of rubber molds 2A and 2B sequentially from a melted portion of thermoplastic resin 6A to an unmelted portion.

Instead of the deformation amount-detecting means 52, the light irradiation molding apparatus 1 can be provided with a temperature detecting means for detecting a temperature of thermoplastic resin 6B when portions of thermoplastic resin 6A are melted. The temperature detecting means detects a temperature of a portion of thermoplastic resin 6B which is irradiated with light X by the light-irradiating means 4, and when a temperature of the portion of the thermoplastic resin 6B rises to a predetermined temperature or higher, the light irradiation molding apparatus 1 relatively moves the pair of rubber molds 2A and 2B and the light-irradiating means 4.

Thermocouples are used as the temperature detecting means, and it is possible to detect temperatures of the rubber molds 2A and 2B located in the vicinity of a melted portion of thermoplastic resin 6B by the thermocouples. In this case, the thermocouples are embedded in a plurality of portions of the rubber molds 2A and 2B. The temperature detecting means detects that thermoplastic resin 6A is melted as a temperature rise of the portions of the rubber molds 2A and 2B. According to this also, it is possible to detect that portions of thermoplastic resin 6A are melted. The controller of the light irradiation molding apparatus 1 can sequentially move the light-irradiating means 4 relative to the pair of rubber molds 2A and 2B from a melted portion of the thermoplastic resin 6A to an unmelted portion.

As the temperature detecting means, along with the thermocouples, it is also possible, in some cases, to use a thermography (such as thermometer for detecting a radiation amount of infrared rays) for detecting a temperature in a non-contact manner.

In EXAMPLE 2 also, other configuration is the same as that of EXAMPLE 1, and the same working effect as EXAMPLE 1 can be obtained.

The invention claimed is:

1. A light irradiation molding apparatus comprising:
a pair of rubber molds made of light-transmissive rubber and forming a cavity between surfaces of the rubber molds which face each other,
a deformation amount-detecting means for detecting a deformation amount of the pair of rubber molds, and
a light source for emitting light through the pair of rubber molds to particulate or solid thermoplastic resin placed in the cavity, wherein
the pair of rubber molds is configured to be moved with respect to each other during irradiation and the light source is configured to be relatively and sequentially moved with respect to the molds by a moving means to sequentially melt portions of the thermoplastic resin.

2. A light irradiation molding apparatus, comprising:
a pair of rubber molds made of light-transmissive rubber and forming a cavity between surfaces of the rubber molds which face each other,
a light source for emitting light to particulate or solid thermoplastic resin placed in the cavity from surfaces of the pair of rubber molds, and
a deformation amount-detecting means for detecting a deformation amount of the pair of rubber molds caused by melting in portions of the thermoplastic resin, wherein
the pair of rubber molds and the light source are configured to be relatively and sequentially moved to sequentially melt portions of the thermoplastic resin, and
the deformation amount-detecting means is configured to detect deformation of a portion of the pair of rubber molds irradiated with light by the light source, and when deformation of the portion of the pair of rubber molds is detected, the pair of rubber molds and the light source are configured to be relatively moved by a moving means.

3. The light irradiation molding apparatus according to claim 1, further comprising a color change-detecting means for detecting color change of the thermoplastic resin when portions of the thermoplastic resin are melted, wherein
the color change-detecting means is configured to detect color of portions of the thermoplastic resin irradiated with light by the light source, and when color change of portions of the thermoplastic resin is detected, the pair of rubber molds and the light source are configured to be relatively moved.

4. The light irradiation molding apparatus according to claim 1, further comprising a temperature detecting means for detecting a temperature of the thermoplastic resin when portions of the thermoplastic resin are melted, or a temperature of the rubber molds located in a vicinity of a melted portion of the thermoplastic resin, wherein
the temperature detecting means is configured to detect a temperature of portions of the thermoplastic resin or portions of the rubber molds which is irradiated with light by the light source, and when the temperature of portions of the thermoplastic resin or portions of the rubber molds rises to a predetermined temperature or higher, the pair of rubber molds and the light source are configured to be relatively moved.

5. The light irradiation molding apparatus according to claim 1, further comprising a vacuum means for vacuuming an interior of the cavity, wherein
the vacuum means is configured to reduce a pressure in the cavity so that the pressure in the cavity becomes lower than a pressure of outside of the pair of rubber molds to generate a suction force between the pair of rubber molds, and the pair of rubber molds is configured to approach each other while being deformed in order from a first melted portion to a later melted portion of the thermoplastic resin to form a molded article of the thermoplastic resin in the cavity whose capacity is reduced.

6. The light irradiation molding apparatus according to claim 5, wherein a frame-shaped or annular to-be fitted concave portion is formed in an entire periphery of the cavity of one of the pair of rubber molds, a frame-shaped or annular fitting convex portion is formed on the other one of the pair of rubber molds to be fitted into the to-be fitted concave portion,
the entire periphery of the cavity is configured to be closed by fitting the fitting convex portion into the to-be fitted concave portion, and
the fitting convex portion is configured to slide relative to the to-be fitted concave portion in order from a first melted portion to a later melted portion of the thermoplastic resin, and the pair of rubber molds is configured to approach each other while being deformed.

7. A light irradiation molding method comprising
using a pair of rubber molds made of light-transmissive rubber and forming a cavity between surfaces of the rubber molds which face each other;
irradiating light from a light source to particulate or solid thermoplastic resin placed in the cavity through the pair of rubber molds;
melting sequentially portions of the thermoplastic resin;
moving the pair of rubber molds with respect to each other during irradiating the light;
detecting a deformation amount of the pair of rubber molds; and
moving the light source relatively and sequentially with respect to the molds.

8. The light irradiation molding method according to claim 7, comprising moving the rubber molds with respect to each other during irradiation to reduce a volume of the cavity.

9. The light irradiation molding apparatus according to claim 1, wherein the light source emits light with a wavelength in a range of 200-2200 nm.

10. The light irradiation molding apparatus according to claim 1, wherein the rubber molds are configured to be moved with respect to each other during irradiation to reduce a volume of the cavity.

11. The light irradiation molding apparatus according to claim 2, wherein the rubber molds are configured to be moved with respect to each other during irradiation to reduce a volume of the cavity.

12. The light irradiation molding apparatus according to claim 2, wherein the deformation amount-detecting means is a distance sensor.

13. The light irradiation molding apparatus according to claim 2, wherein the deformation amount-detecting means is one of a strain gage and a pressure sensor.

14. The light irradiation molding apparatus according to claim 3, wherein the color change-detecting means is one of a spectrophotometer and a photoelectric colorimeter.

* * * * *